May 4, 1943.  G. A. DE VLIEG  2,317,981
SPINDLE CONSTRUCTION
Filed Dec. 6, 1937
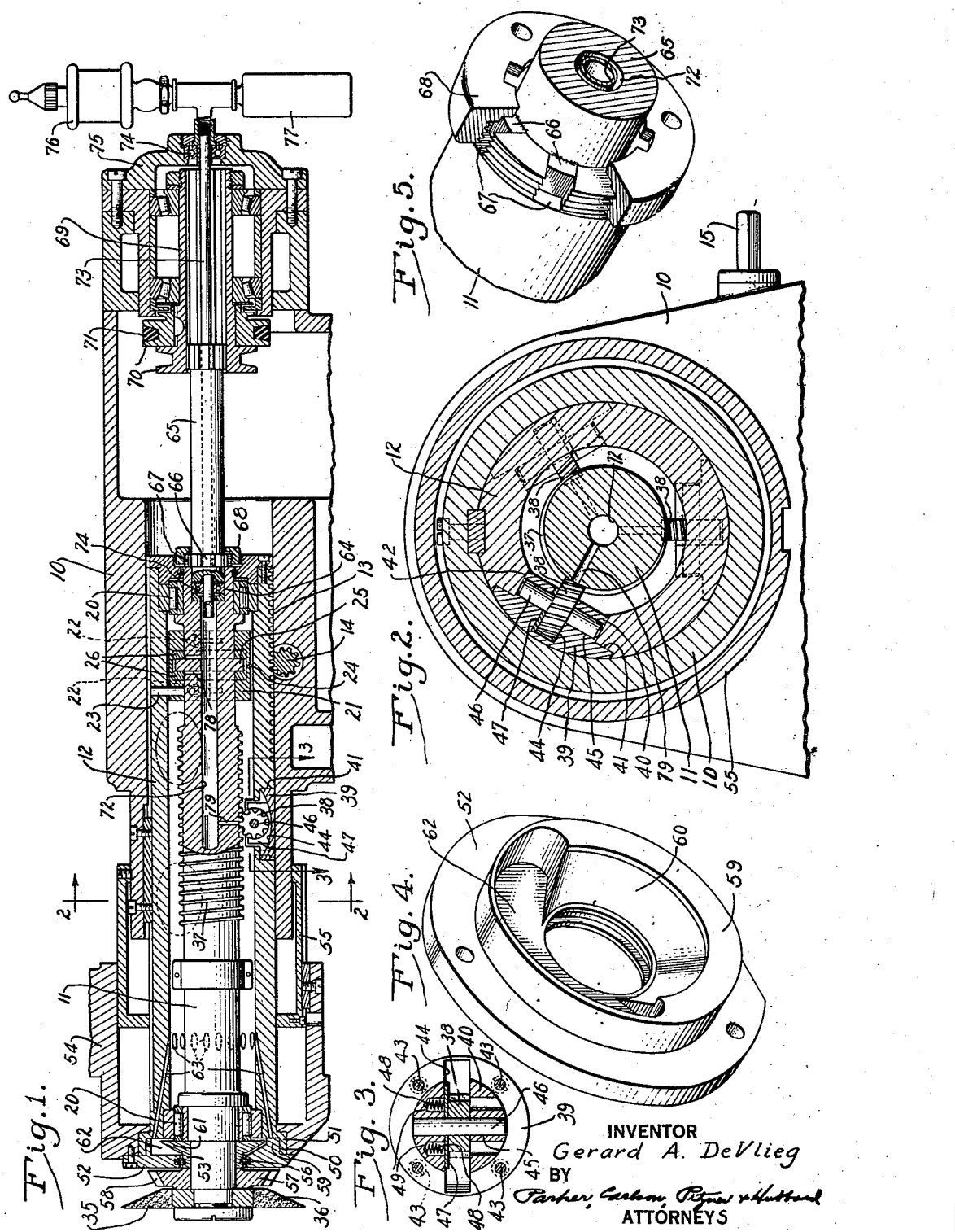
INVENTOR
*Gerard A. DeVlieg*
BY
ATTORNEYS Patented May 4, 1943

2,317,981

UNITED STATES PATENT OFFICE 2,317,981

SPINDLE CONSTRUCTION

Gerard A. De Vlieg, Rockford, Ill.

Application December 6, 1937, Serial No. 178,434

5 Claims. (Cl. 308—135)

The invention relates generally to spindle constructions, and more particularly to structures especially intended for the operative support of rotary grinders, cutters or the like.

In spindle constructions, a limited amount of axial movement of the spindle or "end play" is almost invariably present. While such play may be held to relatively close limits, it is necessary in certain operations, as in finish grinding or cutting, to eliminate end play entirely or at least to such an extent that whatever end play is present does not adversely affect the quality of the work.

It is an object of the invention to provide a spindle construction embodying new and improved means for eliminating end play of the spindle under operating conditions.

Another object is to provide, in association with a spindle, new and improved means for holding said spindle at one limit of its possible axial movement with a yieldable force exerted in the direction in which the spindle is urged by the engagement of a spindle supported tool with a work piece.

Another object of the invention resides in the provision of a spindle for driving a grinding or cutting element which has associated therewith novel means responsive to spindle actuation for imposing a force axially of the spindle for urging it in one direction into abutment with a fixed stop or limit and in opposition to forces tending to move said spindle away from such abutment.

More specifically stated, another object is to provide in a structure of this nature, means which is responsive to the operation of a spindle and, depending on the direction of spindle rotation, imposes a work load on the spindle acting in one direction or the other and resulting in an oppositely directed axial thrust on the spindle effective to overcome any force tending to produce end play.

In conjunction with the foregoing, another object is to impose the work load on the spindle by such means as a friction loaded pinion or series of pinions in mesh with a worm carried by the spindle.

Other objects and advantages will become apparent in the following description and from the accompanying drawing, in which:

Figure 1 is a longitudinal sectional view through a spindle structure, the spindle being shown partially in elevation and partially in section.

Fig. 2 is a transverse section through the structure, taken as indicated by the line 2—2 of Fig. 1.

Fig. 3 is a detail view of a pinion assembly partially in section as indicated by the line 3—3 of Fig. 1.

Fig. 4 is a perspective view of an oil retaining ring forming part of the structure.

Fig. 5 is a perspective view of a spline coupling in the spindle drive.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

With reference to the drawing, in which an exemplary form of mechanism embodying the invention is shown for illustrative purposes, the numeral 10 designates a suitable stationary housing in which a spindle assembly is mounted. While the spindle may be either a work or a tool spindle, it is in this instance shown as being a tool spindle journaled for rotation on a horizontal axis and the assembly comprises generally a spindle 11 rotatably mounted in a supporting sleeve 12 which, in turn, is nonrotatably mounted in the housing 10. Such means as a rack 13, which may be formed to extend longitudinally of the supporting sleeve 12, is engageable by a pinion 14 journaled in the housing 10 for adjusting the assembly axially. The pinion is manually operable by means of a shaft 15 (Fig. 2).

At its front and rear ends, the spindle 11 is supported by suitable roller bearing elements 20. These bearing elements, being of the radial type, do not prevent axial movement of the spindle, but means is provided for confining such axial movement within rather close limits. Thus, between said bearing elements, and near the rear end of the assembly as illustrated, the spindle is encircled by a cylindrical collar 21 disposed within the space between the spindle and the sleeve 12. The collar is preferably formed in two semicylindrical sections secured together as by means of screws 22, and fixed with respect to the sleeve 12 by such means as a pin 23 (Fig. 1). Internally and approximately midway of its ends the collar 21 has an annular recess 24 of substantial width to receive a peripheral flange or rib 25 on the spindle 11. The rib is located substantially equidistantly from the side walls of the recess and is adapted for engagement at opposite sides respectively with two bearing members 26 which may be provided in various forms, and which are shown as flat rings encircling the spindle 11. The members 26, which are not held definitely against rotation, are dimensioned for close running contact with the side faces of the rib 25 and function as stops to limit axial movements of the spindle within reasonable limits.

While the engagement between the rib 25 and the bearing members 26 limits axial movement of the spindle, a small amount of end play will be present due to manufacturing tolerances and wear. Where the spindle is utilized in driving a rotary tool for finishing or like operations in which extreme accuracy is a requisite, end play of the spindle must be eliminated. As an example of a tool for performing such a finishing operation, an abrasive disk wheel 35 is illustrated as being suitably supported by the front end of the spindle. In operation, the rear axially facing area 36 of the wheel is the working face. Instead of a disk wheel, the spindle may carry such a tool as a cup wheel or the like in which an opposite or axially forwardly directed face performs the working operation. In either class of tools, the working or cutting face thereof is directed axially of the spindle and end play of the spindle is, of course, reflected in the finished work. The same result obtains in work spindles where a face transverse of the axis is to be machined.

According to the present invention, end play is eliminated by imposing upon the spindle 11 an axial or thrust force which holds the spindle at one extreme of its limit of movement axially, the direction in which the force is applied preferably being that in which the spindle is urged by the engagement between the working face of the tool and a work piece. In the present embodiment, the force imposed on the spindle is a yieldable one ample to overcome any of the external forces which, during operation of the device, would tend to move the spindle axially.

Referring to Fig. 1, a length of the spindle is provided with a worm 37. This worm is engaged by a series of pinions or worm gears 38 mounted in equidistantly spaced relation circumferentially of the spindle. A suitable relationship of three worm gears is shown in Fig. 2. The worm gear assemblies are substantially identical and only one need be described. The supporting structure for the worm gear 38 comprises a circular plate 39 (Figs. 1, 2 and 3) having a smaller concentric boss 40 thereon. The plate is adapted to fit in a recess 41 in the sleeve 12 with the boss 40 extending through a bore 42 in the sleeve. Countersunk screws 43 or the like secure the plate to said sleeve and the outer face of the plate is arcuate to conform to the curvature of the sleeve.

The boss 40 has a deep diametrically extending recess or slot 44 (Fig. 3) therein formed to parallel the axis of the spindle when the parts are assembled. A bore 45, at right angles to the recess 44, receives a pin or stud 46 upon which the worm gear 38 is supported for rotary movement. The recess 44 is somewhat wider than the worm gear 38 to permit a friction plate 47 to be interposed between the side face of the worm gear 38 and the adjacent wall of the recess. The friction plate is yieldably urged into engagement with the worm gear by such means as helical compression springs 48 seated in pockets 49 in the boss to bear against the friction plate. By varying the tension of the springs, an initial work load of any desired amount may be imposed on the worm wheel 38.

The operation of the device may best be described by reference to Fig. 1. In using the disk wheel illustrated therein, it will be evident that engagement between the working part 36 of the wheel and a work piece will result in an axial thrust on the spindle tending to move it forwardly or toward the left of the sleeve and housing. This movement is limited by the engagement between the rib 25 on the spindle and the left-hand one of the abutting bearing members 26. If under these conditions the spindle is driven to rotate in a counterclockwise direction as viewed from the tool end, each of the worm wheels 38 will be driven in a clockwise direction as viewed in Fig. 1 since the worm 37 has right hand threads. The frictional resistance to turning imposed upon the worm gears by the friction plates 47 is a work load which the spindle must overcome. In doing so, a reverse thrust force is created and imposed upon the spindle in an axial direction which is opposite to the direction of movement of the worm gear at the point of its engagement with the worm. Thus, the thrust force on the spindle with the worm gear rotating counterclockwise is toward the left or in the same direction as the spindle is urged by the engagement of the tool with the work blank. The force exerted on the spindle is a yielding one that results directly from spindle operation and the arrangement as a whole is one in which the thrust force is dependent on the rotational speed of the spindle. By varying the tension of the friction plate springs 48, the force exerted on the spindle will be accordingly varied to have a value not much greater than that necessary to resist the external forces which in operation would be created in opposition thereto.

From the foregoing, it will be evident that the force imposed on the spindle will hold it at one of its limits of endwise movement. Should the disk wheel 35 be replaced by another tool of the type in which a rearwardly axially facing part performs the work, end play of the spindle will be prevented by driving the spindle in the opposite direction. In this case, the spindle is driven clockwise (looking toward the tool end), the worm wheels 38 are driven clockwise (Fig. 1), and the axial thrust force imposed upon the spindle is toward the right to hold the spindle in its rearward extreme limit of possible movement. The same result could be obtained, of course, by reversing the lead of the worm and worm wheels.

The tool end of the spindle 11 extends from the front bearing 20 axially through an annular notch 50 formed in the inner peripheral edge portion of a flange 51 on the sleeve 12. Secured in position against the front face of the flange 51 is an annular cover plate 52 which encircles a sleeve 53 on the spindle 11. In the present instance, the cover plate 52 is bolted to a guard 54 interfitting with the opposite side of the flange 51 and slidably and nonrotatably telescoping with a guide sleeve 55 on the housing 10. An oil wiper 56 of a suitable material, such as felt, is secured in the inner periphery of the plate 52 and is in rubbing engagement with the periphery of the sleeve 53. Fixed on the spindle 11 between the tool element 35 and the disk 53 is a suitable dust fan 57 having peripheral vanes or teeth 58.

Formed on the inner face of the plate 52 is an annular flange 59 which interfits with the notch 50. The lower half of the flange 59 is of a greater thickness than the upper half, and is formed with a conical surface 60. Rigid with the sleeve 53 is an oil flinger 61 in the form of a disk having a conical surface conforming to and spaced slightly from the surface 60. The upper portion of the disk 61 is unconfined in the upper portion of the notch 50 which defines an oil recess 62. A plurality of peripherally spaced oil passages 63 open from the end face of the notch 50 through the wall of the quill or sleeve 12 to the interior of the latter about the spindle 10, and the uppermost of these passages are open to the recess 62.

Lubricant entering the groove 59 through the bearing 20 is carried upwardly by the oil flinger 61 into the recess 62 and is therein thrown by centrifugal force and caused to return through the uppermost passages 63 to the interior of the sleeve 12. Hence, a constant recirculation of the lubricant through the front bearing 20 is effected.

The rear end of the spindle is adapted to be connected to a suitable drive. In the present instance, the rear end is formed with an axial bore 64 slidably receiving the end of an intermediate shaft 65. A plurality of splines 66 on the shaft 65 engage in slots 67 in the wall of the bore 64, and are confined therein by a flange nut 68 threaded onto the spindle 10. The other end of the shaft 65 extends into and is splined for free axial movement to a drive shaft 69 journaled in the housing 10. Two step pulleys 70 are fixed on the shaft 69 and adapted to be connected selectively by a belt 71 to a suitable source of power (not shown).

To provide means for supplying lubricant to the interior of the spindle structure, the rear portion of the spindle 11 is formed with an axial bore 72 opening from the bore 64, and the shafts 65 and 69 are tubular. An oil supply pipe 73 extends through the shafts 65 and 69 into the bore 72, and is rotatably supported at opposite ends by antifriction bearings 74 mounted respectively in the bore 64 and an end plate 75 on the housing 10. An oil cup 76 is secured to and communicates with the outer end of the tube 73, and has a counterweight 77 for maintaining it upright. Lubricant from the bore 72 is adapted to pass through radial ports 78 to the bearing surfaces of the shoulder 25 and the stop elements 26, 50 and through a radial port 79 to the pinions 38 and the interior of the sleeve 12.

I claim as my invention:

1. In a device of the character described, the combination of a spindle, a support for said spindle including means for limiting the endwise movement thereof, and frictionally loaded means driven by said spindle and arranged to set up by its driven movement a thrust force on said spindle effective to urge the spindle toward one limit of its endwise movement.

2. In a device of the character described, the combination of a spindle, a support for said spindle, a worm on said spindle, a plurality of pinions rotatably mounted on said support in angularly spaced relation and in mesh with said worm, and means frictionally engaging each of said pinions for imposing a yieldable load thereon.

3. In a device of the character described, the combination of a tool driving spindle, a support for said spindle, a worm on said spindle, and means for urging said spindle axially in a predetermined direction including a worm wheel on said support engaging said worm, and means for imposing a predetermined movement resisting force on said worm wheel.

4. In a device of the character described, the combination of a tool driving spindle, a support for said spindle, and means for urging said spindle axially including a rotatable member mounted on said support, the axial movement of said spindle being relative to said member, means for imposing a predetermined work load on said rotatable member, and a driving connection between said rotatable member and spindle characterized in that an axial thrust is imparted to said spindle through said connection.

5. The combination of a spindle support, a rotary spindle journaled in said support and carrying a tool, means carried by said spindle for receiving power to rotate said tool, a stop positively limiting the axial movement of the spindle in one direction, and means driven idly in the rotation of said spindle and operable to urge the latter against said stop, said last mentioned means including an idler member rotatably mounted on said support and means resisting rotation of said member with a predetermined force.

GERARD A. DE VLIEG.